(12) United States Patent
Chen

(10) Patent No.: US 11,989,743 B2
(45) Date of Patent: May 21, 2024

(54) SYSTEM AND METHOD FOR PROCESSING PUBLIC SENTIMENT, COMPUTER STORAGE MEDIUM AND ELECTRONIC DEVICE

(71) Applicant: CHANGXIN MEMORY TECHNOLOGIES, INC., Hefei (CN)

(72) Inventor: Yui-Lang Chen, Hefei (CN)

(73) Assignee: Changxin Memory Technologies, Inc., Anhui (CN)

( * ) Notice: Subject to any disclaimer, the term of this patent is extended or adjusted under 35 U.S.C. 154(b) by 351 days.

(21) Appl. No.: 17/455,738

(22) Filed: Nov. 19, 2021

(65) Prior Publication Data

US 2022/0084051 A1    Mar. 17, 2022

Related U.S. Application Data

(63) Continuation of application No. PCT/CN2021/100424, filed on Jun. 16, 2021.

(30) Foreign Application Priority Data

Sep. 11, 2020    (CN) ......................... 202010953021.0

(51) Int. Cl.
*G06F 15/16*    (2006.01)
*G06F 16/215*    (2019.01)
(Continued)

(52) U.S. Cl.
CPC ....... *G06Q 30/0201* (2013.01); *G06F 16/215* (2019.01); *G06F 16/221* (2019.01); *G06F 16/245* (2019.01); *G06F 40/30* (2020.01)

(58) Field of Classification Search
CPC .... G06F 16/221; G06F 16/245; G06F 16/215; G06F 40/30; G06Q 30/0201
(Continued)

(56) References Cited

U.S. PATENT DOCUMENTS 7,961,879 B1 *    6/2011    Spies .................... H04L 9/3073
                                                                  380/282
7,974,994 B2 *    7/2011    Li ....................... G06F 16/9535
                                                                  707/810
(Continued)

FOREIGN PATENT DOCUMENTS

CN    107908619 A    4/2018
CN    109523118 A    3/2019
(Continued)

OTHER PUBLICATIONS

International Search Report as PCT Application No. PCT/CN2021/100424 mailed Sep. 15, 2021, 10 pages.

*Primary Examiner* — Bharat Barot
(74) *Attorney, Agent, or Firm* — Cooper Legal Group, LLC

(57) ABSTRACT

Disclosed are a method and a system for processing public sentiment data, computer storage medium and an electronic device. The system includes: a network data integration platform configured to audit and analyze collected network public sentiment to acquire a sensitivity level of the network public sentiment, and send the network public sentiment and the sensitivity level of the network public sentiment to a big data cluster; the big data cluster configured to send the filtered network public sentiment to a business data integration platform; the business data integration platform configured to screen enterprise public sentiment from the filtered network public sentiment, and store an association relationship among the enterprise public sentiment, an acquired user account level and a sensitivity level of the enterprise public sentiment to a database server; and a data exhibition platform configured to exhibit the enterprise public sentiment with the target sensitivity level to an authenticated user.

9 Claims, 6 Drawing Sheets

(51) Int. Cl.
*G06F 16/22* (2019.01)
*G06F 16/245* (2019.01)
*G06F 40/30* (2020.01)
*G06Q 30/0201* (2023.01)

(58) Field of Classification Search
USPC .......................................... 726/4, 17–18, 21
See application file for complete search history.

(56) References Cited

U.S. PATENT DOCUMENTS

| | | | |
|---|---|---|---|
| 9,703,857 B2* | 7/2017 | Glimcher | G06F 16/289 |
| 11,501,068 B2* | 11/2022 | Parikh | H04L 65/40 |
| 11,531,655 B2* | 12/2022 | White | G06Q 30/0631 |
| 11,704,431 B2* | 7/2023 | Kraus | G06F 16/35 |
| | | | 726/26 |
| 2008/0320010 A1 | 12/2008 | Li et al. | |
| 2010/0325698 A1* | 12/2010 | Ginter | G06Q 20/10 |
| | | | 726/4 |
| 2015/0206265 A1* | 7/2015 | Tupa | G06Q 30/0201 |
| | | | 705/7.29 |
| 2016/0098738 A1* | 4/2016 | Huang | G06Q 30/0201 |
| | | | 705/7.32 |
| 2023/0319533 A1* | 10/2023 | Ly | H04W 24/02 |
| | | | 709/224 |

FOREIGN PATENT DOCUMENTS

| | | |
|---|---|---|
| CN | 109919777 A | 6/2019 |
| CN | 110287313 A | 9/2019 |

* cited by examiner

SYSTEM AND METHOD FOR PROCESSING PUBLIC SENTIMENT, COMPUTER STORAGE MEDIUM AND ELECTRONIC DEVICE

CROSS-REFERENCE TO RELATED APPLICATIONS

This application is a continuation application of International Patent Application No. PCT/CN2021/100424, filed on Jun. 16, 2021, which claims priority to Chinese Patent Application No. 202010953021.0, filed with China National Intellectual Property Administration on Sep. 11, 2020 and entitled "SYSTEM AND METHOD FOR PROCESSING PUBLIC SENTIMENT, COMPUTER STORAGE MEDIUM AND ELECTRONIC DEVICE". International Patent Application No. PCT/CN2021/100424 and Chinese Patent Application No. 202010953021.0 are incorporated herein by reference in their entireties.

TECHNICAL FIELD

The present disclosure relates to the technical field of big data, in particular to a method and a system for processing public sentiment, a computer storage medium and an electronic device.

BACKGROUND

In the era of new media, the continuous development of media technologies and the unceasing innovation of network technologies have promoted the development of new media and accelerated the prosperity of network public sentiment. Compared with traditional media, new media have greater influence, stronger cohesion and more convenient dissemination, and have become an important platform and carrier for different interest groups to express their demands. With this platform, the public is aroused a strong desire for in-depth search, can concern a wide range of issues, and is highly enthusiastic in participating in the supervision of social events. Consequently, a lot of information can easily be infinitely magnified to cause public emergencies. Therefore, for enterprises, how to effectively monitor and deal with the public sentiment is particularly important.

At present, a relevant public sentiment processing system is relatively weak in concurrent processing capacity of data as it is generally deployed with only one distributed relational database, and cannot exhibit data with different sensitive levels for users with different account levels.

In view of this, it is urgent develop a novel system for processing public sentiment in this field.

It should be noted that the information disclosed in the background of the Description is only configured to enhance the understanding of the background of the present disclosure.

SUMMARY

An objective of the present disclosure is to provide a method and a system for processing public sentiment, a computer storage medium and an electronic device, so as to at least avoid defects of a relatively weak concurrent processing capability and an inability to exhibit data with different sensitivity levels for users with different account levels to some extent in the related art.

Other features and advantages of the present disclosure will become apparent from the following detailed description, or in part, will be learned by practice of the present disclosure.

According to a first aspect of the present disclosure, a system for processing public sentiment is provided, and includes a network data integration platform, a big data cluster, a business data integration platform, a database server and a data exhibition platform, wherein the network data integration platform is configured to audit and analyze collected network public sentiment to acquire a sensitivity level of the network public sentiment, and send the network public sentiment and the sensitivity level of the network public sentiment to the big data cluster; the big data cluster is configured to filter invalid data in the network public sentiment and send the filtered network public sentiment to the business data integration platform; the business data integration platform is configured to screen enterprise public sentiment from the filtered network public sentiment, and store an association relationship among the enterprise public sentiment, an acquired user account level and a sensitivity level of the enterprise public sentiment to the database server; and the data exhibition platform is configured to request the database server based on an account level of an authenticated user to acquire enterprise public sentiment with a target sensitivity level, and exhibit the enterprise public sentiment with the target sensitivity level to the authenticated user.

According to a second aspect of the present disclosure, a method for processing public sentiment is provided, and includes: auditing and analyzing collected network public sentiment by a network data integration platform to acquire, a sensitivity level of the network public sentiment, and sending the network public sentiment and the sensitivity level of the network public sentiment to a big data cluster; filtering invalid data in the network public sentiment by the big data cluster and sending the filtered network public sentiment to a business data integration platform; screening enterprise public sentiment by the business data integration platform from the filtered network public sentiment, and storing an association relationship among the enterprise public sentiment, an acquired user account level and a sensitivity level of the enterprise public sentiment to a database server; and requesting the database server by a data exhibition platform based on an account level of an authenticated user to acquire enterprise public sentiment with a target sensitivity level, and exhibiting the enterprise public sentiment with the target sensitivity level to the authenticated user.

According to a third aspect of the present disclosure, there is provided a computer storage medium storing a computer program therein, wherein the computer program, when executed by a processor, causes the processor to perform the method for processing the public sentiment in the above second aspect.

According to a fourth aspect of the present disclosure, there is provided art electronic device, including: a processor and a memory for storing an instruction executable by the processor, wherein the instruction, when executed by the processor, causes the processor to perform the method for processing the public sentiment in the above second aspect.

It can be seen from the above technical solutions that the system and the method for processing the public sentiment, the computer storage medium and the electronic device according to exemplary embodiments of the present disclosure at least have the following advantages and positive effects.

In the technical solutions provided by some embodiments of the present disclosure, on the one hand, the network data integration platform audits and analyzes the collected network public sentiment to acquire the sensitivity level of the network public sentiment, and sends the network public sentiment and the sensitivity level of the network public sentiment to the big data cluster, such that the big data cluster filters the invalid data in the network public sentiment and sends the filtered network public sentiment to the business data integration platform. Therefore, not only is the data audit efficiency improved by solving the problem of the lower efficiency caused by manual data audit and verification in the related art, but also the amount of data required to be processed is reduced, the influence of the invalid data on a subsequent data processing process is avoided, and the subsequent data processing efficiency is improved. Furthermore, the business data integration platform screens the enterprise public sentiment from the filtered network public sentiment, and stores the association relationship among the enterprise public sentiment, the acquired user account level and the sensitivity level of the enterprise public sentiment to the database server, such that the technical problem of the relatively weak concurrency caused by deploying only one distributed big data cluster in the related art can be solved, thereby improving the concurrent processing capability of the system. On the other hand, the data exhibition platform requests the database server based on the account level of the authenticated user to acquire the enterprise public sentiment with the target sensitivity level, and exhibits the enterprise public sentiment with the target sensitivity level to the authenticated user. Thus, the enterprise public sentiment with the different sensitivity levels can be correspondingly exhibited to users with different account levels, such that an intelligent information security management and control mechanism is provided, enabling the exhibited data to be closer to needs of the users, and improving the information acquisition efficiency of the users.

It should be understood that both the foregoing general description and the following detailed description in the present disclosure are only exemplary and explanatory and are not restrictive of the present disclosure.

BRIEF DESCRIPTION OF THE DRAWINGS

The accompanying drawings, which are incorporated in and constitute a part of this Description, illustrate embodiments consistent with the present disclosure and, together with the Description, serve to explain the principles of the present disclosure. Apparently, the accompanying drawings in the following description show merely some embodiments of the present disclosure, and persons of ordinary skill in the art may still derive other drawings from these accompanying drawings without creative efforts.

DETAILED DESCRIPTION

Figure 1:
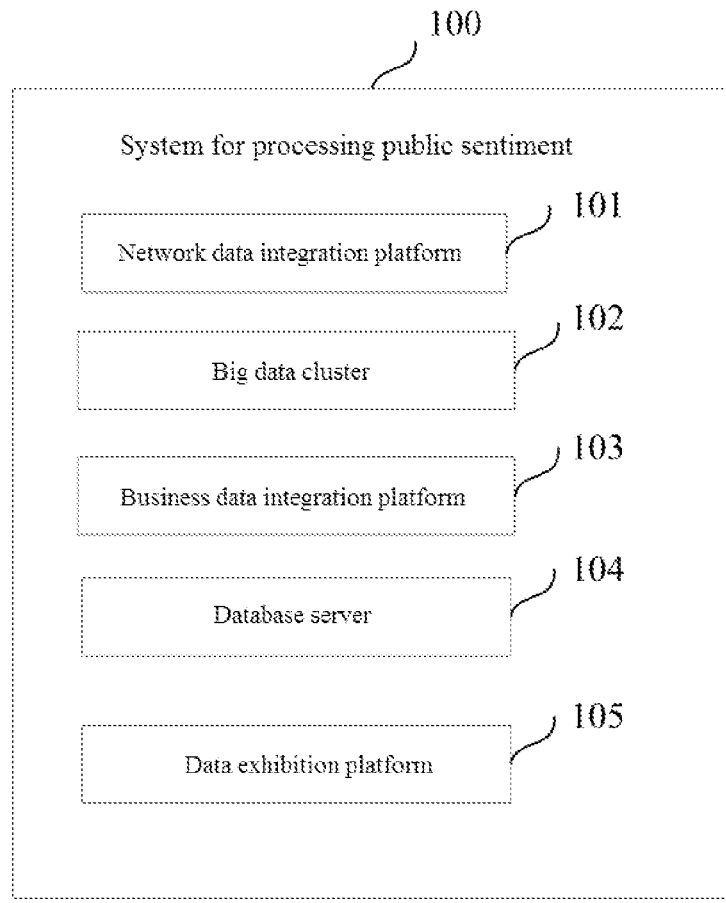
FIG. 1 shows a schematic structure diagram of a system for processing public sentiment according to an exemplary embodiment of the present disclosure.

The exemplary embodiments are described more comprehensively below with reference to the accompanying drawings. However, the exemplary embodiments can be implemented in many forms and should not be construed as limited to the examples set forth herein. On the contrary, these embodiments provided will enable the present disclosure to be more thorough and complete, and fully convey the scope of the exemplary embodiments to those skilled in the art. The features, structures, or characteristics described may be combined in one or more embodiments in any suitable manner. In the following description, numerous specific details are provided so as to give a thorough understanding of the embodiments of the present disclosure. However, those skilled in the art will recognize that the technical solutions of the present disclosure may be practicable in the event of omitting one or more of the specific details, or adopting other methods, components, apparatuses, steps, etc. In other cases, well-known technical solutions are not shown or described in detail to avoid obscuring of all aspects of the present disclosure.

In the Description, the terms "a", "an", "this" and "the" are configured to indicate the presence of one or more elements/components/etc.; the terms "including" and "having" are configured to mean open inclusion and mean that there may be other elements/components/etc. besides the listed elements/components/etc.; and the terms "first", "second" and the like are only used as markers, not limiting the number of objects.

In addition, the accompanying drawings are only schematic illustrations of the present disclosure, and are not necessarily drawn to scale. In the drawings, the same reference numerals denote the same or similar parts, and thus the repeated description thereof will be omitted. Some block diagrams shown in the accompanying drawings are functional entities, which do not necessarily correspond to physically or logically independent entities.

At present, only one distributed relational database is generally deployed in the related art, the concurrent processing capacity of data is relatively weak, and related data need to be audited manually, leading to relatively poor data processing efficiency. In addition, it is impossible to exhibit data with different sensitivity levels for users with different account levels, and sensitive information cannot be prevented from flowing into an information exhibition platform.

In the embodiments of the present disclosure, firstly, a system for processing public sentiment is provided, which at least overcomes defects of a weak concurrent processing capability and an inability to exhibit the data with the different sensitivity levels for the users with the different account levels to some extent in the related art.

FIG. 1 shows a schematic structure diagram of a system for processing public sentiment according to an exemplary embodiment of the present disclosure. An executive body of the system for processing the public sentiment may be a server for processing the public sentiment.

As shown in FIG. 1, a system 100 for processing public sentiment according to an embodiment of the present disclosure may include a network data integration platform 101, a big data cluster 102, a business data integration platform 103, a database server 104 and a data exhibition platform 105.

In the network data integration platform, the big data cluster, the business data integration platform, the database server and the data exhibition platform, the network data integration platform is configured to audit and analyze collected network public sentiment to acquire a sensitivity level of the network public sentiment, and send the network public sentiment and the sensitivity level of the network public sentiment to the big data cluster;

the big data cluster is configured to filter invalid data in the network public sentiment and send the filtered network public sentiment to the business data integration platform;

the business data integration platform is configured to screen enterprise public sentiment from the filtered network public sentiment, and store an association relationship among the enterprise public sentiment, an acquired user account level and a sensitivity level of the enterprise public sentiment to the database server; and the data exhibition platform is configured to request the database server based on an account level of an authenticated user to acquire enterprise public sentiment with a target sensitivity level, and exhibit the enterprise public sentiment with the target sensitivity level to the authenticated user.

In the technical solution provided by the embodiment shown in FIG. 1, on the one hand, the network data integration platform audits and analyzes the collected network public sentiment to acquire the sensitivity level of the network public sentiment, and sends the network public sentiment and the sensitivity level of the network public sentiment to the big data cluster, such that the big data cluster filters the invalid data in the network public sentiment and sends the filtered network public sentiment to the business data integration platform. Therefore, not only is the data audit efficiency improved by solving the problem of the lower efficiency caused by manual data audit and verification in the related art, but also the amount of data required to be processed is reduced, the influence of the invalid data on a subsequent data processing process is avoided, and the subsequent data processing efficiency is improved. Furthermore, the business data integration platform screens the enterprise public sentiment from the filtered network public sentiment, and stores the association relationship among the enterprise public sentiment, the acquired user account level and the sensitivity level of the enterprise public sentiment to the database server, such that the technical problem of the relatively weak concurrency caused by deploying only one distributed big data cluster in the related art can be solved, thereby improving the concurrent processing capability of the system. On the other hand, the data exhibition platform requests the database server based on the account level of the authenticated user to acquire the enterprise public sentiment with the target sensitivity level, and exhibits the enterprise public sentiment with the target sensitivity level to the authenticated user. Thus, the enterprise public sentiment with the different sensitivity levels can be correspondingly exhibited to users with different account levels, such that an intelligent information security management and control mechanism is provided, enabling the exhibited data to be closer to needs of the users, and improving the information acquisition efficiency of the users.

The specific implementation process of each part in FIG. 1 is described in detail below.

The network data integration platform 101 is configured to audit and analyze collected network public sentiment to acquire a sensitivity level of the network public sentiment, and send the network public sentiment and the sensitivity level of the network public sentiment to the big data cluster.

Figure 2:
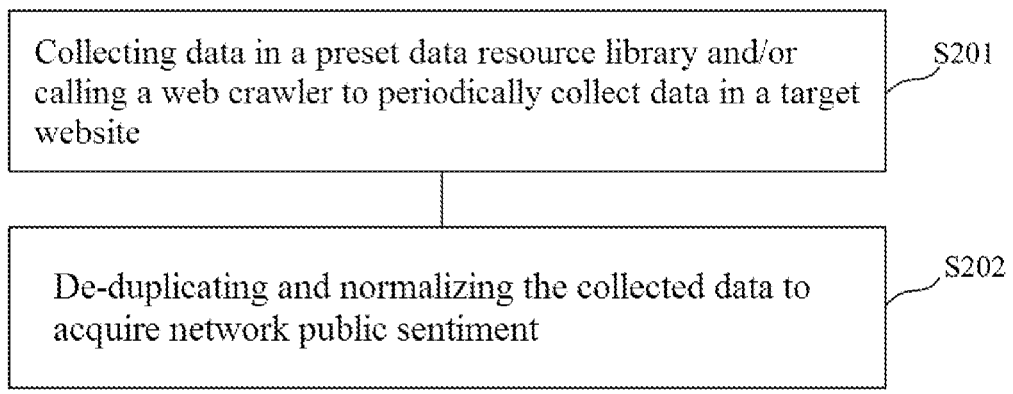
FIG. 2 shows a schematic sub-flowchart of a system for processing public sentiment according to an exemplary embodiment of the present disclosure.

Exemplarily, referring to FIG. 2, FIG. 2 shows a schematic sub-flowchart of a system for processing public sentiment according to an exemplary embodiment of the present disclosure, and specifically shows a sub-flowchart of collecting network public sentiment by the network data integration platform, including steps S201 and S202. The specific implementation is explained below with reference to FIG. 2.

In step S201, data in a preset data resource library is collected and/or a web crawler is called to periodically collect data in a target website.

Exemplarily, the data resource library may be preset, and the data in the data resource library may be public sentiment collected by a public sentiment expert, public sentiment provided by relevant data providers, etc. Furthermore, the network data integration platform can collect the data in the data resource library. In view of the fact that the data in the data resource library generally has a fixed data format which is difficult to transform, and has a stable data source, a lot of development and operation and maintenance costs can be avoided.

Exemplarily, the web crawler may also be called to periodically collect the data in the target website. The target website may be domestic and foreign related search engines (Baidu, Sogou, 360), Weibo, WeChat subscriptions, forums, Tieba, Blog, and other website platforms, which can be set according to actual situations and belong to the protection scope of the present disclosure. Exemplarily, a timing program may be set (for example, a timing duration is 10 minutes); and the data on the target website is collected every 10 minutes, and the collected data is converted into data of a unified format. Therefore, a large amount of data can be collected without purchasing funds, and the data collection cost is reduced.

In step S202, the collected data is de-duplicated and normalized to acquire the network public sentiment.

After being collected, the data can be de-duplicated to remove redundant data, such that a large amount of the redundant data is prevented from entering a subsequent processing flow, the data simplification is ensured, processing threads of a processor are reduced, and data processing efficiency is guaranteed.

After the de-duplication, the data can be normalized, such that the normalized network public sentiment can be acquired, thereby facilitating the subsequent data processing. The collected network public sentiment may be massive and include public sentiment of multiple industries. Exemplarily, the public sentiment may include public sentiment of the computer industry, insurance industry, automobile industry, food safety industry, electronic circuit industry, etc.

Exemplarily, after acquiring the network public sentiment, the network public sentiment may be stored in a Java Script Object Notation (JSON, which is a lightweight data exchange format) format. The data in the JSON format can not only improve readability, but also reduce complexity, thereby facilitating data exchange and data processing.

Figure 3:
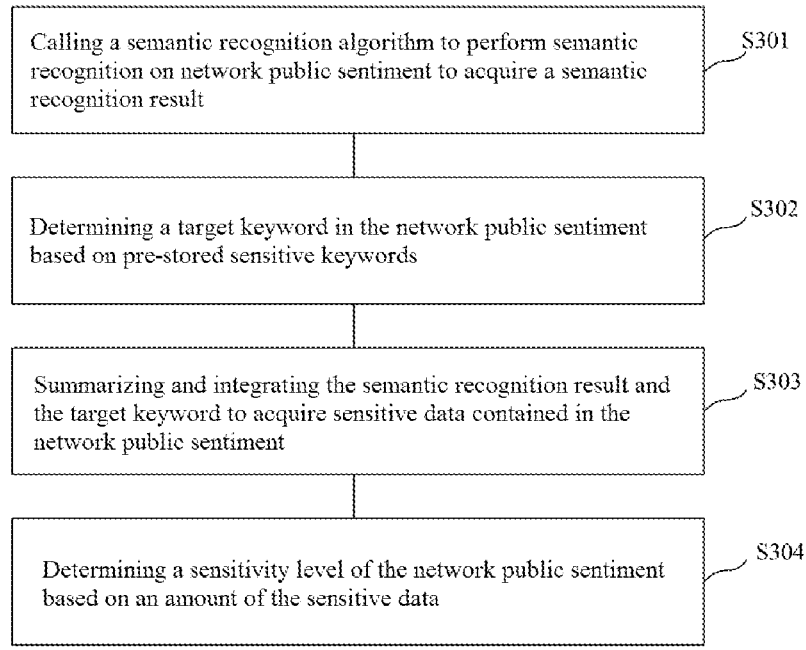
FIG. 3 shows a schematic sub-flowchart of a system for processing public sentiment according to an exemplary embodiment of the present disclosure.

After collecting the network public sentiment, the network data integration platform can further call a relevant automatic audit module to audit and analyze the data, so as to acquire the sensitivity level of the network public sentiment. This process may refer to key technologies such as pattern matching algorithm, text semantic analysis, hot topic discovery, and bad image content recognition, so as to strengthen the security management of the data and further ensure the legitimacy, health and security of the data. Exemplarily, referring to FIG. 3, FIG. 3 shows a schematic sub-flowchart of a system for processing public sentiment according to an exemplary embodiment of the present disclosure, and specifically shows a schematic sub-flowchart of auditing and analyzing the collected network public sentiment by the network data integration platform to acquire the sensitivity level of the network public sentiment, including steps S301 to S304. The specific implementation is explained below with reference to FIG. 3.

In step S301, a semantic recognition algorithm is called to perform semantic: recognition on the network public sentiment to acquire a semantic recognition result.

Exemplarily, the network data integration platform can call the semantic: recognition algorithm to perform the semantic recognition on the network public sentiment to acquire the semantic recognition result. Exemplarily, a deep convolution neural network may also be trained to acquire a semantic recognition model, and the network public sentiment is input into the semantic recognition model to acquire the semantic recognition result thereof.

In step S302, a target keyword in the network public sentiment is determined based on pre-stored sensitive keywords.

Exemplarily, a big data analyst (referring to a practitioner who scientifically analyzes, mines and exhibits big data based on various analysis methods and uses the data for decision support) can also pre-store some sensitive keywords. Exemplarily, the sensitive keywords may be keywords referring to, for example, violence, damage to enterprise image, negative semantic vocabularies, etc. Furthermore, the network public sentiment can be compared and matched with these sensitive keywords to determine the target keyword.

In step S303, the semantic recognition result and the target keyword are summarized and integrated to acquire sensitive data contained in the network public sentiment.

After the semantic recognition result is acquired and the above target keyword is recognized, the semantic recognition result and the target keyword can be summarized and integrated to acquire the sensitive data contained in the network public sentiment, and the sensitive data is marked.

In step S304, the sensitivity level of the network public sentiment is determined based on the amount of the sensitive data.

Exemplarily, in a case that the amount of the sensitive data contained in the network public sentiment A is 8, the sensitivity level of the network public sentiment A can be determined as level I (high level); in a case that the amount of sensitive data contained in network public sentiment B is 4, the sensitivity level of network public sentiment B can be determined as level II (medium level); and in a case that the amount of sensitive data contained in the network public sentiment C is 0, the sensitivity level of the network public sentiment C can be determined as level III (low level).

Furthermore, the network data integration platform can send the network public sentiment and the sensitivity level thereof to the big data cluster. The big data cluster allows a developer to either run written programs in the cloud or use services provided in the cloud, or both. The big data cluster is a platform integrating data access, data processing, data storage, query and retrieval, analysis and mining, and an application interface.

Continuing to refer to FIG. 1, the big data cluster 102 is configured to filter the invalid data in the network public sentiment and send the filtered network public sentiment to the business data integration platform.

Exemplarily, the big data cluster can filter the invalid data contained in the network public sentiment, and send the filtered network public sentiment to the business data integration platform. It should be noted that in the present disclosure, the big data cluster may be a distributed relational database, such as GreenPlum. Therefore, on the one hand, the big data cluster provides a larger data storage space and achieves a data backup function, and avoids the loss caused by data loss in an application database. On the other hand, the big data cluster can also improve a computing ability and query speed of massive data.

Exemplarily, the invalid data may be public sentiment messages whose data authenticity cannot be determined, such as gossip, hearsay and rumors. Exemplarily, some invalid keywords (for example, titles of gossip, hearsay, rumors, etc.) can be set in advance, then the network public sentiment can be compared and matched with these invalid keywords to determine the invalid data in the network public sentiment, and further, the big data cluster can filter the determined invalid data and send the filtered network public sentiment to the business data integration platform.

It should be noted that the big data cluster can further analyze and process the network public sentiment to classify and summarize it. For example, the network public sentiment can be classified into sudden natural disasters, production safety accidents, mass incidents, public health incidents, enterprise images, judicial incidents, economic and people's livelihood incidents, overseas emergencies, etc. Therefore, in the subsequent processing process, different categories of network public sentiment can be classified and processed, such that the order of data and the pertinence of data processing are improved. Continuing to refer to FIG. 1, the business data integration platform 103 is configured to screen the enterprise public sentiment from the filtered network public sentiment, and store an association relationship among the enterprise public sentiment, an acquired user account level and a sensitivity level of the enterprise public sentiment to the database server 104.

Furthermore, the business data integration platform 103 can screen the enterprise public sentiment from the filtered network public sentiment. Exemplarily, the enterprise public sentiment may be enterprise public sentiment of a target enterprise, or public sentiment of all enterprises in the industry associated with the target enterprise. Thus, it is convenient for the target enterprise to understand a development trend in the industry and improve its competitiveness among peers.

The business data integration platform can further provide an audit operation interface, such that an auditor can log into the system and input first interaction operation information (for example, manually binding the enterprise public sentiment with different sensitivity levels to corresponding account levels) to realize the correlation between the enterprise public sentiment with the different sensitivity levels and the different account levels. Exemplarily, referring to the relevant explanation of the above step S304, the enterprise public sentiment with the sensitivity level I may be associated with an account level (superior users, for example, superior managers in an enterprise). That is, the enterprise public sentiment with the sensitivity level I can be exhibited for the superior users. Enterprise public sentiment with sensitivity level II may be associated with an account level (junior users, for example, junior managers in the enterprise). That is, the enterprise public sentiment with the sensitivity level II can be exhibited for the junior users. Enterprise public sentiment with sensitivity level III may be associated with an account level (low-level users, for example, social personnel outside the enterprise and grassroots personnel inside the enterprise). That is, the enterprise public sentiment with the sensitivity level III can be exhibited for the low-level users.

Exemplarily, the enterprise public sentiment with the sensitivity levels I, and III may be associated with the account level (the superior users). That is, the enterprise public sentiment with the sensitivity levels I, II and III can be exhibited for the superior users. The enterprise public sentiment with the sensitivity levels II and III may be associated with the account level (the junior users). That is, the enterprise public sentiment with the sensitivity levels II and III can be exhibited for the junior users. The enterprise public sentiment with the sensitivity level III may be associated with the account level (the low-level users). That is, the enterprise public sentiment with the sensitivity level III can be exhibited for the low-level users.

Exemplarily, the authority of the big data analyst can also be set through the above audit operation interface as: adjusting processing parameters of the system and modifying algorithm programs related to the system.

The account authority of a chief auditor is set as: auditing all data in the system, and setting exhibition, query, exhibition withdrawal, query withdrawal and the like of all the data. The account authority of a group auditor is set as: auditing data of a certain category, and setting authorities of exhibition, query, exhibition withdrawal, query withdrawal and the like of this category of the data.

The account authority of the superior users is set as: providing classified exhibition of the enterprise public sentiment with the sensitivity levels I, II and III, and reading and inquiring the enterprise public sentiment with the sensitivity levels I, II and III. The account authority of the junior users is set as: providing classified exhibition of the enterprise public sentiment with the sensitivity levels II and III, and reading and inquiring the enterprise public sentiment with the sensitivity levels II and III. The account authority of the low-level users is set as: reading and inquiring the enterprise public sentiment with the sensitivity level.

Different account levels can be distinguished by user names. For example, the user names of the superior users may be set starting with a fixed character "superior-user", the user names of the junior users starting with a fixed character "junior-user", and the user names of the low-level users starting with a fixed character "user". It should be noted that the above characters may be set voluntarily according to actual situations, belonging to the protection scope of the present disclosure.

Exemplarily, the auditor can further evaluate a risk value corresponding to the above enterprise public sentiment, and thus formulate relevant public sentiment prevention and control measures in advance based on the risk value to stop relevant public sentiment crisis in time, avoiding enterprise losses caused by the crisis.

Exemplarily, the business data integration platform can also analyze and process the enterprise public sentiment to classify and summarize the enterprise public sentiment. For example, the enterprise public sentiment can be classified into positive public sentiment (namely, data beneficial to enterprise image promotion), neutral public sentiment (namely, data uninfluential in enterprise image) and negative public sentiment (namely, data unfavorable to enterprise image promotion), or can be classified into enterprise public sentiment related to the core technology, enterprise public sentiment related to the enterprise image and the like. Therefore, different categories of the enterprise public sentiment can be classified and processed in the subsequent processing process, thereby improving the order of the data and the pertinence of the data exhibition.

After acquiring an association relationship between the user account levels and the sensitivity levels of the enterprise public sentiment, the business data integration platform can store the association relationship among the enterprise public sentiment, the acquired user account levels and the sensitivity levels of the enterprise public sentiment to a stand-alone database server to further improve the reliability of the data. It should be noted that the database server in the present disclosure may be PostgreSQL (an open source relational database, which is characterized by powerful functions and which supports many advanced features such as object-oriented features), thereby reducing the device cost and ensuring the relatively strong concurrent processing capability.

Meanwhile, in view of the stand-alone database server, the data exhibition platform can directly request data from the database server, which can solve the technical problem of the weak concurrency caused by deploying only one distributed big data cluster in the related art, thereby improving the concurrent processing capability of the system.

Continuing to refer to FIG. 1, the data exhibition platform 105 is configured to request the database server based on an account level of an authenticated user to acquire enterprise public sentiment with a target sensitivity level, and exhibit the enterprise public sentiment with the target sensitivity level to the authenticated user.

Figure 4:
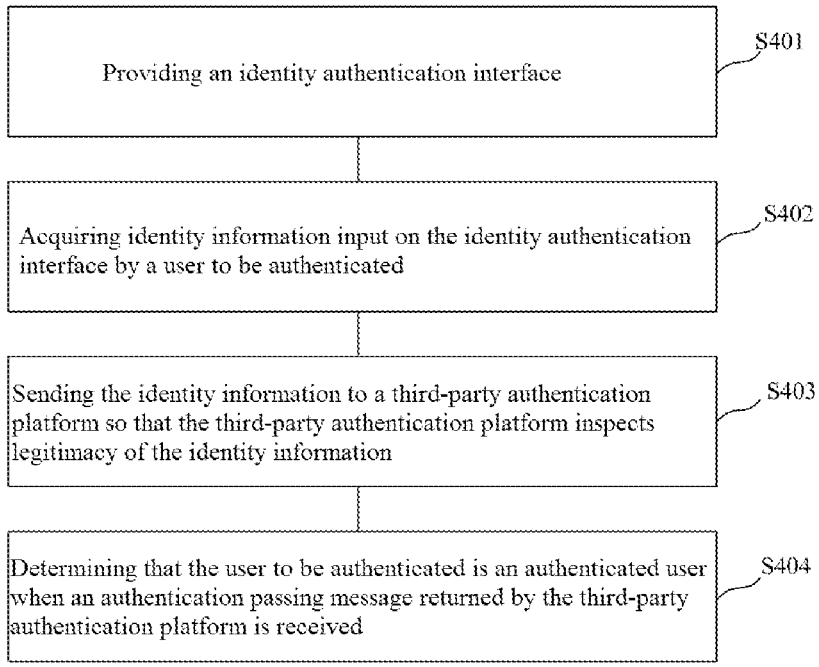
FIG. 4 shows a schematic sub-flowchart of a system for processing public sentiment according to an exemplary embodiment of the present disclosure.

The data exhibition platform in the present disclosure may be iNews new platform. Specifically, referring to FIG. 4, FIG. 4 shows a schematic sub-flowchart of a system for processing public sentiment according to an exemplary embodiment of the present disclosure, and specifically shows a sub-flowchart of providing an identity authentication interface by the data exhibition platform to determine an authenticated user, including steps S401 to S404. The specific implementation is explained below with reference to FIG. 4.

In step S401, an identity authentication interface is provided.

Exemplarily, the data exhibition platform can provide the identity authentication interface. Exemplarily, the identity authentication interface can display controls for filling a user name and its login password, and for example, may further include a picture verification code, a digital verification code, etc., which can be set according to an actual situation, belonging to the protection scope of the present disclosure.

In step S402, identity information input on the identity authentication interface by a user to be authenticated is acquired.

Furthermore, the user to be authenticated can input his/her identity information on the above identity authentication interface.

In step S403, the identity information is sent to a third-party authentication platform so that the third-party authentication platform inspects legitimacy of the identity information.

The data exhibition platform can send the above identity information to the third-party authentication platform so that the third-party authentication platform inspects the legitimacy of the identity information. Exemplarily, the third-party authentication platform may refer to a third-party authentication institution other than the globebiznews.com. Third-party authentication is adopted to verify the true and legal identity of an applicant of Goods Information Display (GID), eliminate false information to the greatest extent, and ensure the benefits of the GID. Particularly, the third-party authentication platform can perform Lightweight Directory Access Protocol (LDAP) authentication on the identity information. The LDAP authentication is an authentication mode built by WSS3.0 and the LDAP protocol. That is, the identity information is uploaded to an LDAP server. The user to be authenticated is authenticated by data on the LDAP server. After the authentication is passed, the third-party authentication platform can send an authentication passing message to the data exhibition platform.

In step S404, it is determined that the user to be authenticated is an authenticated user when the authentication passing message returned by the third-party authentication platform is received.

The data exhibition platform can determine that the user to be authenticated is an authenticated user upon receiving an authentication passing message returned by the third-party authentication platform.

Furthermore, the data exhibition platform can request the database server based on the account level of the authenticated user, and exhibit the requested enterprise public sentiment to the authenticated user. Exemplarily, the corresponding account authority can be determined based on the user name of the authenticated user. For example, in the case that the user name of the authenticated user starts with the fixed character "superior-user", it can be determined that the account level of the user is the superior user. Thus, the requested enterprise public sentiment with the target sensitivity level may be the enterprise public sentiment with the sensitivity levels I, II and III. Therefore, the enterprise public sentiment with different sensitivity levels can be exhibited for users with different account levels, such that the exhibited data is closer to the needs of users and the information acquisition efficiency of the users is improved.

Figure 5:
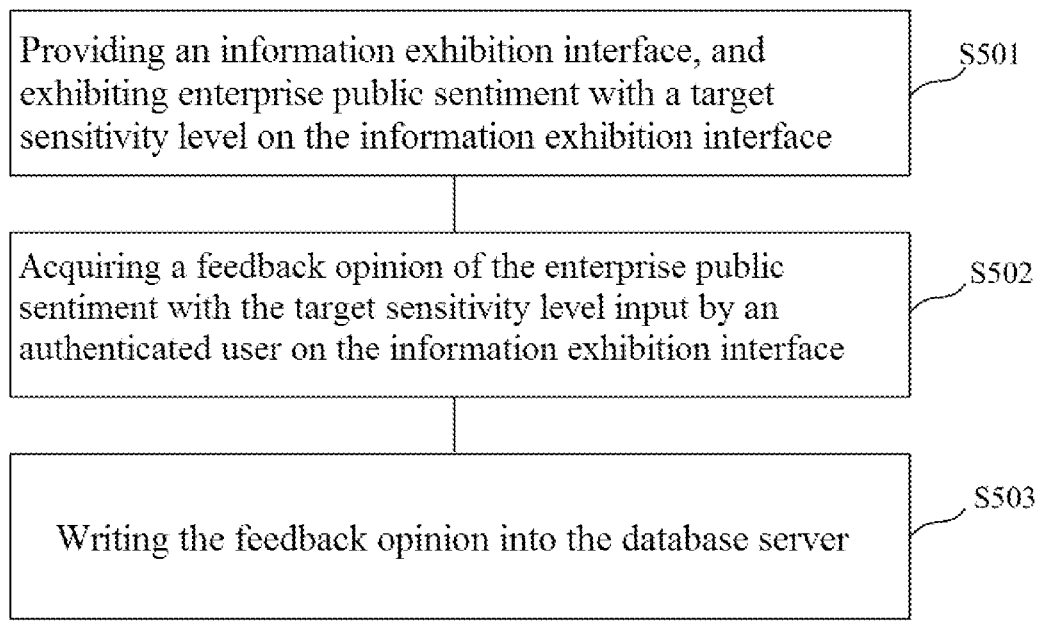
FIG. 5 shows a schematic sub-flowchart of a system for processing public sentiment according to an exemplary embodiment of the present disclosure.

Exemplarily, referring to FIG. 5, FIG. 5 shows a schematic sub-flowchart of a system for processing public sentiment according to an exemplary embodiment of the present disclosure, and specifically shows a flowchart of automatically listening to a user feedback opinion by the data exhibition platform, including steps S501 to S503. The specific implementation is explained below with reference to FIG. 5.

In step S501, an information exhibition interface is provided, and enterprise public sentiment with a target sensitivity level is exhibited on the information exhibition interface.

Exemplarily, the data exhibition platform can provide the information exhibition interface, and the requested enterprise public sentiment (from the database server based on the account level of the authenticated user) with the target sensitivity level is exhibited on the information exhibition interface.

In step S502, a feedback opinion of the enterprise public sentiment with the target sensitivity level input by an authenticated user on the information exhibition interface is acquired.

Furthermore, the authenticated user can browse the enterprise public sentiment with the target sensitivity level, and after browsing, can input the feedback opinion on each piece of the enterprise public sentiment on the above information exhibition interface. For example, the exhibited X data is helpful to enhance the enterprise image, and the exhibited Y data may damage the enterprise image.

In step S503, the feedback opinion is written into the database server.

Furthermore, the data exhibition platform can write the above feedback opinion into the database server.

Therefore, when it is detected that the feedback opinion contains a specified keyword, a prompt message can be sent to the auditor (by, for example, displaying a message pop-up window on the relevant audit operation interface, etc.), such that after receiving the above message, the auditor can input second interaction operation information (for example, manually deleting data, etc.) through the audit operation interface to withdraw an exhibition of related enterprise public sentiment. Exemplarily, the specified keyword may be a keyword that may cause losses to the enterprise, such as "damaging the enterprise image, and revealing a core technical secret of the enterprise". For example, in a case that the feedback opinion is "the exhibited Y data may damage the enterprise image", an exhibition of the Y data is withdrawn from the data exhibition platform. That is, the data exhibition platform cannot request the Y data.

Figure 6:
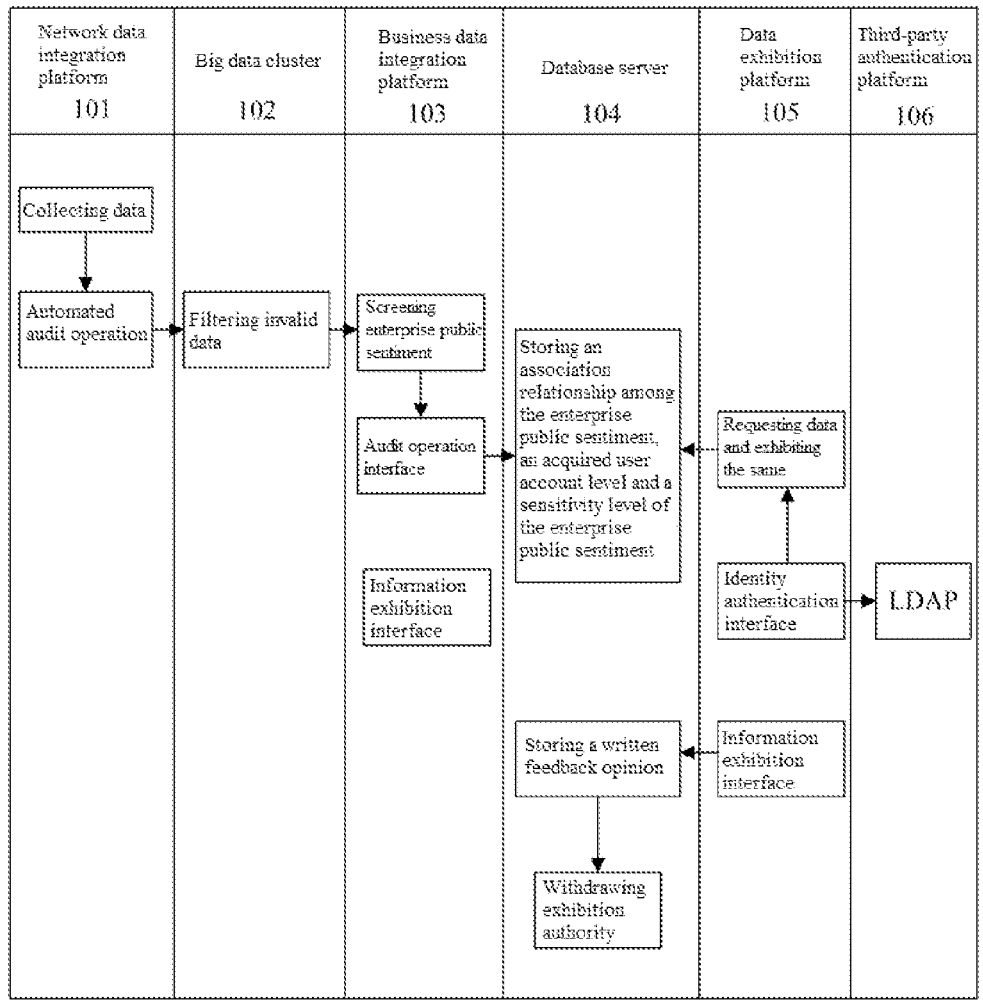
FIG. 6 shows an overall interaction flowchart of a system for processing public sentiment according to an exemplary embodiment of the present disclosure.

Exemplarily, referring to FIG. 6, FIG. 6 shows an overall interaction flowchart of a system for processing public sentiment according to an exemplary embodiment of the present disclosure. The specific implementation is explained below with reference to FIG. 6.

The network data integration platform 101 is configured to collect data in a preset data resource library and/or call a web crawler to periodically collect data in a target website to acquire network public sentiment, audit and analyze (referring to an automatic audit operation) the collected network public sentiment according to a semantic recognition algorithm and pre-stored sensitive keywords to acquire a sensitivity level of the network public sentiment, and send the network public sentiment and the sensitivity level thereof to the big data cluster.

The big data cluster 102 is configured to filter invalid data and send the filtered network public sentiment to the business data integration platform.

The business data integration platform 103 is configured to screen the enterprise public sentiment from the filtered network public sentiment, provide an audit operation interface, store an association relationship among the enterprise public sentiment, a user account level set by an auditor and a sensitivity level of the enterprise public sentiment to the database server 104, and provide an information exhibition interface for users to read and query data.

The data exhibition platform 105 is configured to provide an identity authentication interface, and send identity information of a user to be authenticated to a third-party authentication platform 106 where legitimacy of an user identity is inspected through a LDAP service of the third-party authentication platform; request the database server based on an account level of an authenticated user to acquire enterprise public sentiment with a target sensitivity level, and exhibit the enterprise public sentiment with the target sensitivity level to the authenticated user; and provide an information exhibition interface, acquire a feedback opinion of the authenticated user, write the feedback opinion into the database server 104, and withdraw an exhibition of a target public sentiment on the data exhibition platform in a case that the feedback opinion corresponding to the target public sentiment contains a specified keyword.

Figure 7:
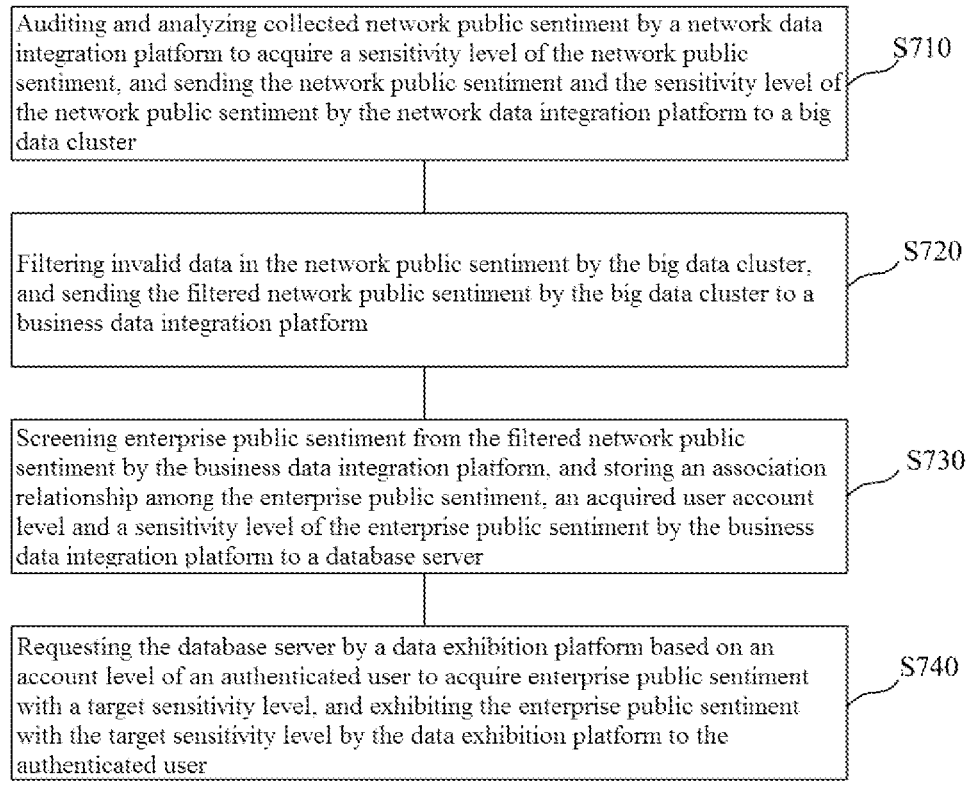
FIG. 7 shows a schematic flowchart of a method for processing public sentiment according to an exemplary embodiment of the present disclosure.

The present disclosure further provides a method for processing public sentiment. Exemplarily, referring to FIG. 7, FIG. 7 shows a schematic flowchart of a method for processing public sentiment according to an exemplary embodiment of the present disclosure. An executive body of the method for processing the public sentiment may be a server for processing the public sentiment.

Referring to FIG. 7, the method for processing the public sentiment according to an embodiment of the present disclosure includes the following steps.

In step S710, collected network public sentiment is audited and analyzed by a network data integration platform to acquire a sensitivity level of the network public sentiment, and the network public sentiment and the sensitivity level of the network public sentiment are sent to a big data cluster by the network data integration platform.

In step S720, invalid data in the network public sentiment is filtered by the big data cluster and the filtered network public sentiment is sent to a business data integration platform by the big data cluster.

In step S730, enterprise public sentiment is screened from the filtered network public sentiment by the business data integration platform, and an association relationship among the enterprise public sentiment, an acquired user account level and a sensitivity level of the enterprise public sentiment is stored by the business data integration platform to the database server.

In step S740, the database server is requested by the data exhibition platform based on an account level of an authenticated user to acquire enterprise public sentiment with a target sensitivity level, and the enterprise public sentiment with the target sensitivity level is exhibited by the data exhibition platform to the authenticated user.

In an exemplary embodiment of the present disclosure, the network data integration platform collects data in a preset data resource library and/or calls a web crawler to periodically collect data in a target website, and de-duplicates and normalizes the collected data to acquire the network public sentiment.

In an exemplary embodiment of the present disclosure, the network data integration platform calls a semantic recognition algorithm to perform semantic recognition on the network public sentiment to acquire a semantic recognition result, determines a target keyword in the network public sentiment based on pre-stored sensitive keywords, summarizes and integrates the semantic recognition result and the target keyword to acquire sensitive data contained in the network public sentiment, and determines a sensitivity level of the network public sentiment based on the amount of sensitive data.

In an exemplary embodiment of the present disclosure, the business data integration platform provides an audit operation interface, and determines an association relationship between user account levels and sensitivity levels of the enterprise public sentiment based on first interaction operation information input by an auditor on the audit operation interface.

In an exemplary embodiment of the present disclosure, the data exhibition platform provides an identity authentication interface, acquires identity information input on the identity authentication interface by a user to be authenticated, sends the identity information to a third-party authentication platform so that the third-party authentication platform inspects legitimacy of the identity information, and determines that the user to be authenticated is an authenticated user upon receiving an authentication passing message returned by the third-party authentication platform.

In an exemplary embodiment of the present disclosure, the business data integration platform provides an information exhibition interface, exhibits enterprise public sentiment with a target sensitivity level on the information exhibition interface, acquires a feedback opinion of the enterprise public sentiment with the target sensitivity level input by the authenticated user on the information exhibition interface, and writes the feedback into the database server.

In an exemplary embodiment of the present disclosure, the business data integration platform sends a prompt message to the auditor upon detecting that the feedback opinion contains a specified keyword, provides the audit operation interface, and withdraws an exhibition of the enterprise public sentiment with the target sensitivity level based on second interaction operation information input by the auditor on the audit operation interface.

Specific details of each module in the method for processing the public sentiment have been described in detail in the above corresponding system for processing the public sentiment, and thus are not repeated herein.

Based on the above technical solutions, on the one hand, in the present disclosure, the data audit efficiency is improved by solving the problem of the lower efficiency caused by manual data audit and verification in the related art, and meanwhile, the amount of data required to be processed is reduced, the influence of the invalid data on a subsequent data processing process is avoided, and the subsequent data processing efficiency is improved. Further, the technical problem of the weak concurrency caused by deploying only one distributed big data cluster in the related art is solved, thereby improving the concurrent processing capability of the system. On the other hand, the enterprise public sentiment with the different sensitivity levels can be correspondingly exhibited to users with different account levels, such that an intelligent information security management and control mechanism is provided, enabling the exhibited data to be closer to needs of the users, and improving the information acquisition efficiency of the users.

It should be noted that although several modules or units of the device for action execution are mentioned in the above detailed description, this division is not mandatory. Actually, according to the embodiments of the present disclosure, the features and functions of two or more modules or units described above may be embodied in one module or unit. On the contrary, the feature and function of one module or unit described above can be further divided into multiple modules or units to be embodied.

In addition, although steps of the method provided by the present disclosure are described in the accompany drawings according to a particular order, it does not require or imply that these steps must be executed in accordance with the specific order or a desired result cannot be realized until all shown steps are executed. Additionally or alternatively, some steps may be omitted, multiple steps may be integrated into one step to be performed, and/or a step may be divided into multiple steps.

Through the description of the above embodiments, those skilled in the art can easily understand that the exemplary embodiments described herein can be realized by software, or by combining software with necessary hardware. Therefore, the technical solutions according to the embodiments of the present disclosure can be embodied in the form of a software product. The software product may be stored in a non-volatile storage medium (which may be a CD-ROM, a U disk, a mobile hard disk, etc.) or on the network, and includes several instructions, wherein the instructions, when executed by a computing device (which may be a personal computer, a server, a mobile terminal, a network device, or the like), cause the computing device to execute the method according to the embodiments of the present disclosure.

In an exemplary embodiment of the present disclosure, a computer storage medium capable of implementing the above method is further provided. A program product capable of implementing the above method of the Description is stored in the computer storage medium. In some possible embodiments, various aspects of the present disclosure may also be implemented in the form of a program product, which includes a program code. The program code, when running on a terminal device, causes the terminal device to execute the steps according to various exemplary embodiments of the present disclosure described in the above section of the exemplary methods of the Description.

Figure 8:
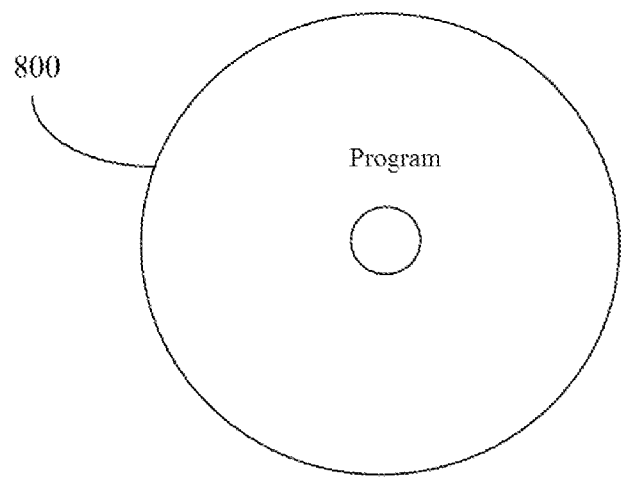
FIG. 8 shows a schematic structure diagram of a computer storage medium according to an exemplary embodiment of the present disclosure.

Referring to FIG. 8, a program product 800 for implementing the above method according to an embodiment of the present disclosure is described, may adopt a portable compact disc read-only memory (CD-ROM) and include a program code, and may run on a terminal device, such as a personal computer. However, the program product of the present disclosure is not limited to this. In the present disclosure, the readable storage medium may be any tangible medium containing or storing a program which may be used by or used in combination with an instruction execution system, apparatus, or device.

The program product may adopt any combination of one or more readable media. The readable medium may be a readable signal medium or a readable storage medium. The readable storage medium may be, for example but not limited to, an electronic, magnetic, optical, electromagnetic, infrared, or semiconductor system, apparatus, or device, or any combination of the foregoing. More specific (non-exhaustive lists) examples of the readable storage medium include: an electrical connection having one or more wires, a portable diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

The computer-readable signal medium may include a data signal carrying a readable program code that is propagated in a baseband or as part of a carrier wave. The propagated data signal may be in various forms, including but not limited to, electromagnetic signals, optical signals or any suitable combination of the foregoing. The readable signal medium may also be any readable medium except the readable storage medium. The readable medium may send, propagate or transmit a program for use by or use in combination with an instruction execution system, apparatus or device.

The program code contained on the readable medium may be transmitted by any appropriate medium, including but not limited to wireless, a wired, an optical fiber cable, RF, etc., or any suitable combination of the foregoing.

The program code for executing the operations of the present disclosure may be written in one or more programming languages or any combination thereof, the programming languages including object-oriented programming languages such as Java and C++, as well as conventional procedural programming languages such as "C" language or similar programming languages. The program code may be executed entirely or partly on a user computing device, or executed as an independent software package, or executed partly on the user computing device and partly on a remote computing device, or executed entirely on the remote computing device or server. In a case involving the remote computing device, the remote computing device may be connected to the user computing device via any kind of network, including a local area network (LAN) or a wide area network (WAN), or may be connected to an external computing device (e.g., via the Internet provided by an Internet service provider).

In addition, in an exemplary embodiment of the present disclosure, an electro device capable of implementing the above method is further provided.

Those skilled in the art can understand that various aspects of the present disclosure can be implemented as a system, a method or a program product. Therefore, various aspects of the present disclosure can be specifically embodied in the following forms: a complete hardware implementation, a complete software implementation (including firmware, microcode, etc.), or an implementation combining hardware and software, which can be collectively referred to as "circuit", "module" or "system" herein.

An electronic device 900 according to this embodiment of the present disclosure is described below with reference to FIG. 9. The electronic device 900 shown in FIG. 9 is just an example, and should not bring any limitation to functions and a use scope of the embodiments of the present disclosure.

Figure 9:
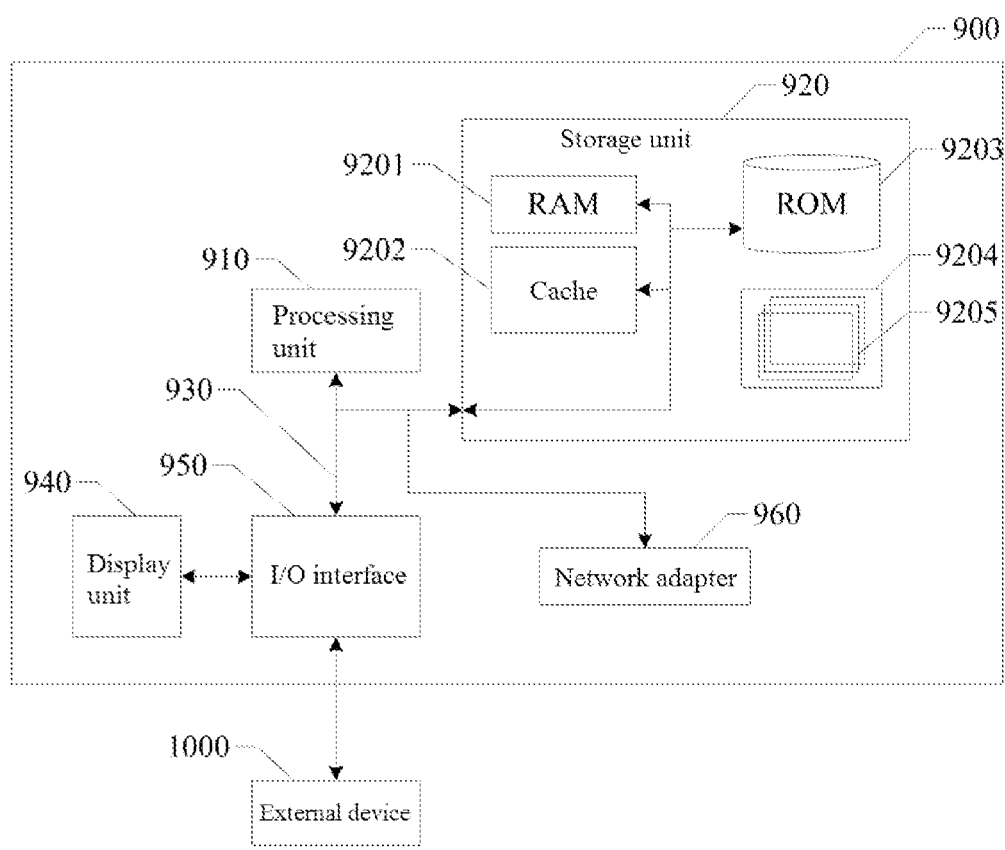
FIG. 9 shows a schematic structure diagram of an electronic device according to an exemplary embodiment of the present disclosure.

As shown in FIG. 9, the electronic device 900 is shown in the form of a general-purpose computing device. Components of the electronic device 900 may include, but are not limited to, the above at least one processing unit 910, the above at least one storage unit 920, a bus 930 connecting different system components (including the storage unit 920 and the processing unit 910), and a display unit 940.

The storage unit stores a program code. The program code, when executed by the processing unit 910, causes the processing unit 910 to execute the steps according to various exemplary embodiments of the present disclosure described in the above section of the exemplary methods of the Description. For example, as shown in FIG. 7, the processing unit 910 can perform the following steps: step S710, auditing and analyzing collected network public sentiment by a network data integration platform to acquire a sensitivity level of the network public sentiment, and sending the network public sentiment and the sensitivity level of the network public sentiment to a big data cluster; step S720, filtering invalid data in the network public sentiment by the big data cluster and sending the filtered network public sentiment to the business data integration platform; step S730, screening enterprise public sentiment by the business data integration platform from the filtered network public sentiment, and storing an association relationship among the enterprise public sentiment, an acquired user account level and a sensitivity level of the enterprise public sentiment to the database server; and step S740, requesting the database server by a data exhibition platform based on an account level of an authenticated user to acquire enterprise public sentiment with a target sensitivity level, and exhibiting the enterprise public sentiment with the target sensitivity level to the authenticated user.

The storage unit 920 may include a readable medium in the form of a volatile storage unit, such as a random-access memory (RAM) 9201 and/or a cache memory 9202, and may further include a read-only memory (ROM) 9203.

The storage unit 920 may also include a program/utility 9204 having a set of (at least one) program modules 9205. Such program modules 9205 include but are not limited to an operating system, one or more application programs, other program modules, and program data. Each of the operating system, one or more application programs, other program modules, and program data or some combination thereof, may include an implementation of a networking environment.

The bus 930 may represent one or more of several types of bus structures, including a storage unit bus or storage unit controller, a peripheral bus, a graphics acceleration port, a processor, or a local bus using any of the bus structures.

The electronic device 900 may also communicate with one or more external devices 1000 (for example, a keyboard, a pointing device, a Bluetooth device, etc.), and may also communicate with one or more devices enabling a user to interact with the electronic device 900, and/or any devices (such as a router and a modem) enabling the electronic device 900 to communicate with one or more other computing devices, Such communication may be performed through an input/output (110) interface 950. Moreover, the electronic device 900 may also communicate with one or inure networks (for example, a LAN, a WAN and/or a public network such as the Internet) through a network adapter 960. As shown in the figure, the network adapter 960 communicates with other modules of the electronic device 900 through the bus 930. It should be understood that although not shown in the figure, other hardware and/or software modules may be used in conjunction with the electronic device 900, and may include but not are limited to a microcode, a device driver, a redundant processing unit, an external disk drive array, an RAID system, a magnetic tape drive, a data backup storage system, etc.

Through the description of the above embodiments, those skilled in the art can easily understand that the exemplary embodiments described herein can be realized by software, or by combining software with necessary hardware. Therefore, the technical solutions according to the embodiments of the present disclosure can be embodied in the form of a software product. The software product may be stored in a non-volatile storage medium (which may be a CD-ROM, a U disk, a mobile hard disk, etc.) or on the network, and includes several instructions, wherein the instructions, when executed by a computing device (which may be a personal computer, a server, a terminal device, a network device, or the like), cause the computing device to execute the method according to the embodiments of the present disclosure.

In addition, the above accompany drawings are only a schematic illustration of the processing steps included in the method according to the exemplary embodiment of the present disclosure, and are not intended for limitation. It is easy to understand that the processing steps shown in the above figures does not indicate or limit the time sequence of theses processing steps. In addition, it is also easy to understand that these processing steps can be performed synchronously or asynchronously in, for example, a plurality of modules.

Other embodiments of the present disclosure will be apparent to those skilled in the art from consideration of the description and practice of the present disclosure. The present disclosure is intended to cover any variations, uses, or adaptations of the present disclosure following the general principles thereof and including such departures from the present disclosure as come within known or customary practice in the art. It is intended that the description and examples be considered as exemplary only, with a true scope and spirit of the present disclosure being indicated by the claims.

What is claimed is:

1. A system for processing public sentiment, comprising:
a network data integration platform, a big data cluster, a business data integration platform, a database server and a data exhibition platform, wherein
the network data integration platform is configured to audit and analyze network public sentiment about news collected from at least one target website to acquire a sensitivity level of the network public sentiment, and send the network public sentiment and the sensitivity level of the network public sentiment to the big data cluster;
the big data cluster is configured to filter invalid data in the network public sentiment to obtain filtered network public sentiment and send the filtered network public sentiment to the business data integration platform;
the business data integration platform is configured to screen enterprise public sentiment from the filtered network public sentiment, and store an association relationship among the enterprise public sentiment, an acquired user account level and a sensitivity level of the enterprise public sentiment to the database server; and
the data exhibition platform is configured to request the database server based on an account level of an authenticated user to acquire enterprise public sentiment with a target sensitivity level, and exhibit the enterprise public sentiment with the target sensitivity level to the authenticated user.

2. The system according to claim 1, wherein the network data integration platform is further configured to:
collect data in a preset data resource library to obtain collected data and call a web crawler to periodically collect data in the at least one target website; and
de-duplicate and normalize the collected data to acquire the network public sentiment.

3. The system according to claim 2, wherein the network data integration platform is further configured to:
call a semantic recognition algorithm to perform semantic recognition on the network public sentiment to acquire a semantic recognition result;
determine a target keyword in the network public sentiment based on pre-stored sensitive keywords;
summarize and integrate the semantic recognition result and the target keyword to acquire sensitive data contained in the network public sentiment; and
determine the sensitivity level of the network public sentiment based on an amount of the sensitive data.

4. The system according to claim 1, wherein the business data integration platform is further configured to:
provide an audit operation interface; and
determine an association relationship between the acquired user account level and the sensitivity level of the enterprise public sentiment based on first interaction operation information input by an auditor on the audit operation interface.

5. The system according to claim 1, wherein the data exhibition platform is further configured to:
provide an identity authentication interface;
acquire identity information input on the identity authentication interface by a user to be authenticated;

send the identity information to a third-party authentication platform so that the third-party authentication platform inspects legitimacy of the identity information; and determine that the user to be authenticated is the authenticated user upon receiving an authentication passing message returned by the third-party authentication platform.

6. The system according to claim 1, wherein the data exhibition platform is further configured to:

provide an information exhibition interface, and exhibit the enterprise public sentiment with the target sensitivity level on the information exhibition interface;

acquire a feedback opinion of the enterprise public sentiment with the target sensitivity level input by the authenticated user on the information exhibition interface; and write the feedback opinion into the database server.

7. The system according to claim 6, wherein the business data integration platform is further configured to:

send a prompt message to an auditor upon detecting that the feedback opinion contains a specified keyword;

provide an audit operation interface; and withdraw an exhibition of the enterprise public sentiment with the target sensitivity level based on second interaction operation information input by the auditor on the audit operation interface.

8. A method for processing public sentiment, comprising:

auditing and analyzing network public sentiment about news collected from at least one target website by a network data integration platform to acquire a sensitivity level of the network public sentiment, and sending the network public sentiment and the sensitivity level of the network public sentiment by the network data integration platform to a big data cluster;

filtering invalid data in the network public sentiment by the big data cluster to obtain filtered network public sentiment, and sending the filtered network public sentiment by the big data cluster to a business data integration platform;

screening enterprise public sentiment from the filtered network public sentiment by the business data integration platform, and storing an association relationship among the enterprise public sentiment, an acquired user account level and a sensitivity level of the enterprise public sentiment by the business data integration platform to a database server; and requesting the database server by a data exhibition platform based on an account level of an authenticated user to acquire enterprise public sentiment with a target sensitivity level, and exhibiting the enterprise public sentiment with the target sensitivity level by the data exhibition platform to the authenticated user.

9. A non-transitory computer storage medium storing a computer program therein, wherein the computer program, when executed by a processor, causes the processor to execute a method for processing public sentiment according, wherein the method comprises:

auditing and analyzing network public sentiment about news collected from at least one target website by a network data integration platform to acquire a sensitivity level of the network public sentiment, and sending the network public sentiment and the sensitivity level of the network public sentiment by the network data integration platform to a big data cluster;

filtering invalid data in the network public sentiment by the big data cluster to obtain filtered network public sentiment, and sending the filtered network public sentiment by the big data cluster to a business data integration platform;

screening enterprise public sentiment from the filtered network public sentiment by the business data integration platform, and storing an association relationship among the enterprise public sentiment, an acquired user account level and a sensitivity level of the enterprise public sentiment by the business data integration platform to a database server; and requesting the database server by a data exhibition platform based on an account level of an authenticated user to acquire enterprise public sentiment with a target sensitivity level, and exhibiting the enterprise public sentiment with the target sensitivity level by the data exhibition platform to the authenticated user.

\* \* \* \* \*